United States Patent
Kropf et al.

(10) Patent No.: US 7,184,169 B2
(45) Date of Patent: Feb. 27, 2007

(54) INTERLEAVED DOCUMENT RENDERING

(75) Inventors: Linn J. Kropf, Boise, ID (US); David G. Bohan, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 977 days.

(21) Appl. No.: 10/228,628

(22) Filed: Aug. 26, 2002

(65) Prior Publication Data

US 2004/0036914 A1 Feb. 26, 2004

(51) Int. Cl.
*G06F 15/00* (2006.01)
*G06K 1/00* (2006.01)

(52) U.S. Cl. .............. 358/1.18; 358/1.9; 358/1.15; 358/1.16; 358/1.17

(58) Field of Classification Search ............ 359/1.9, 359/1.15, 1.18; 710/107; 715/810
See application file for complete search history.

(56) References Cited

U.S. PATENT DOCUMENTS

| | | | | |
|---|---|---|---|---|
| 6,167,473 | A * | 12/2000 | Kho ........................ | 710/107 |
| 6,741,270 | B1 * | 5/2004 | Rzepkowski et al. ...... | 715/810 |
| 6,785,013 | B1 * | 8/2004 | Ota et al. ................ | 358/1.15 |
| 7,042,593 | B2 * | 5/2006 | Matsushima .............. | 358/1.9 |

* cited by examiner

*Primary Examiner*—Kimberly Williams
*Assistant Examiner*—Satwant Singh

(57) ABSTRACT

A document, including first and last images therein, is in storage. An image is optically scanned with a scanning mechanism. The optically scanned image is composed as a digital image. The document in storage is output such that the composed digital image is at a predetermined location between the first and the last images of the document.

31 Claims, 5 Drawing Sheets

Fig. 1
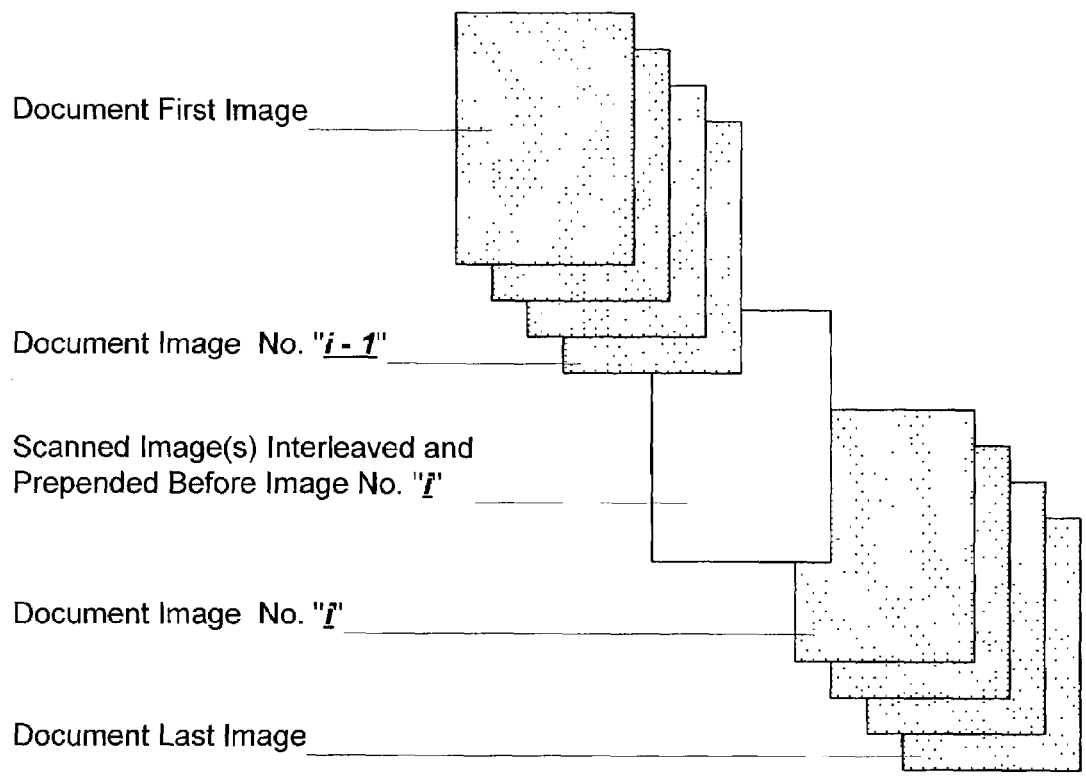
Document First Image
Document Image No. "*i - 1*"
Scanned Image(s) Interleaved and Prepended Before Image No. "*i*"
Document Image No. "*i*"
Document Last Image
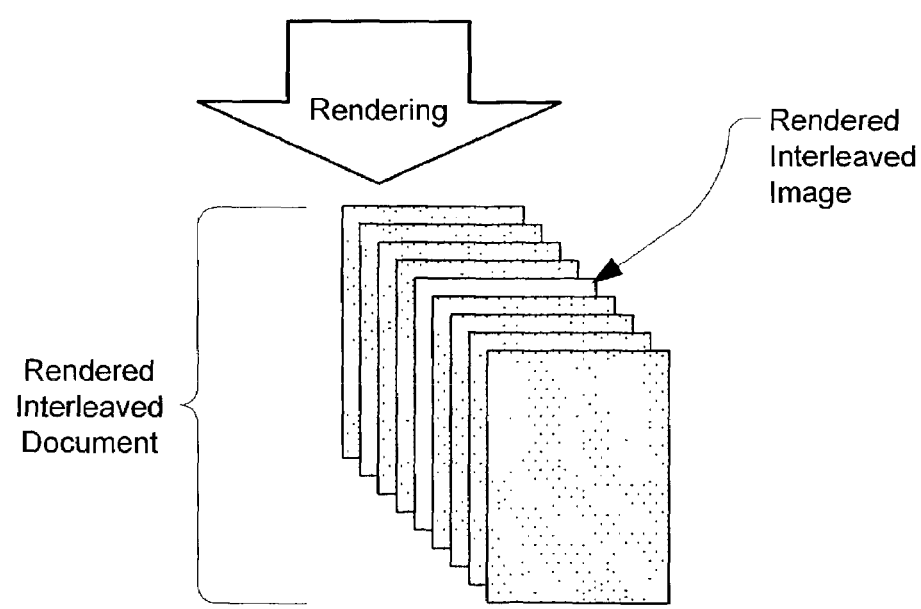
Rendering
Rendered Interleaved Image
Rendered Interleaved Document

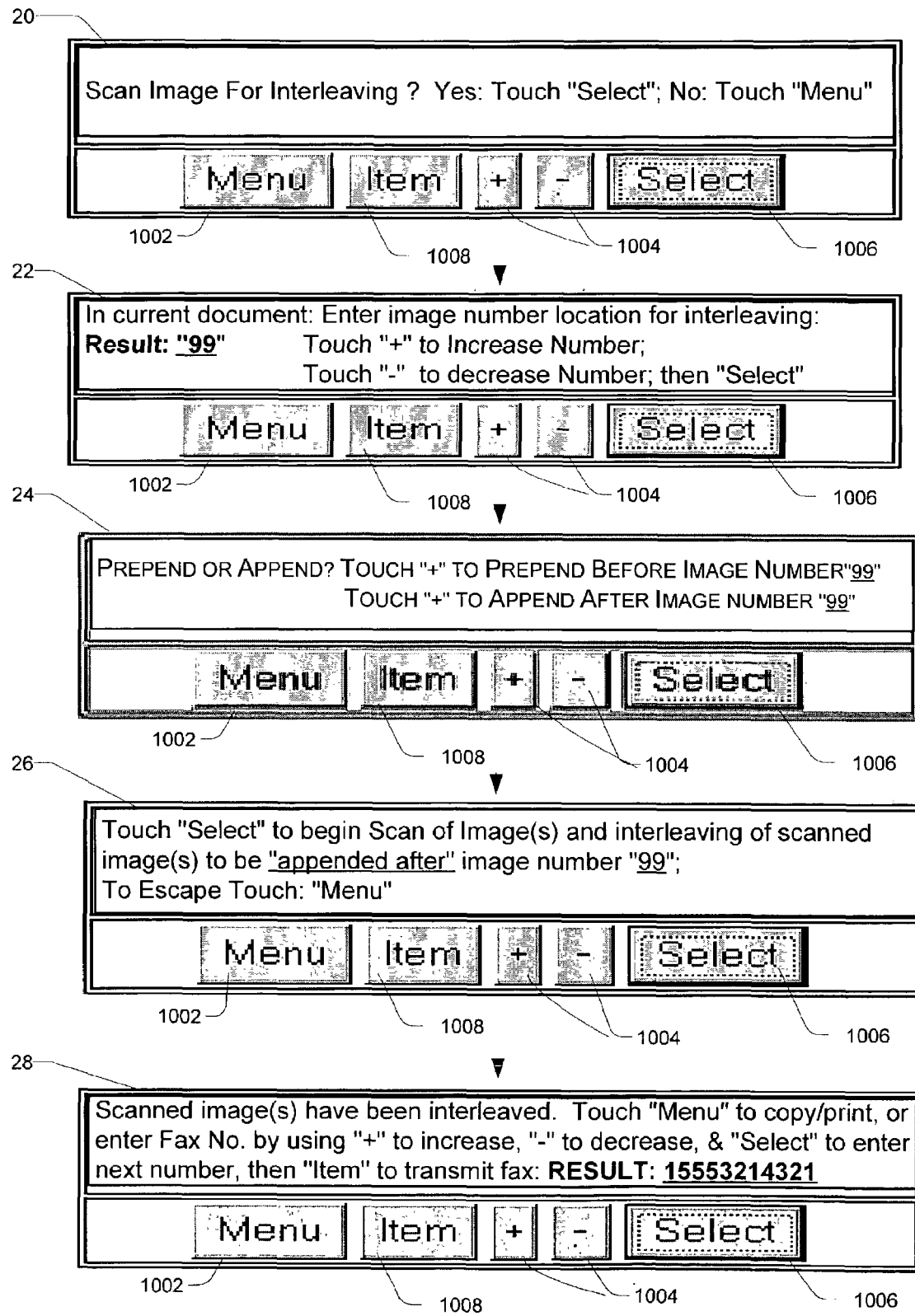

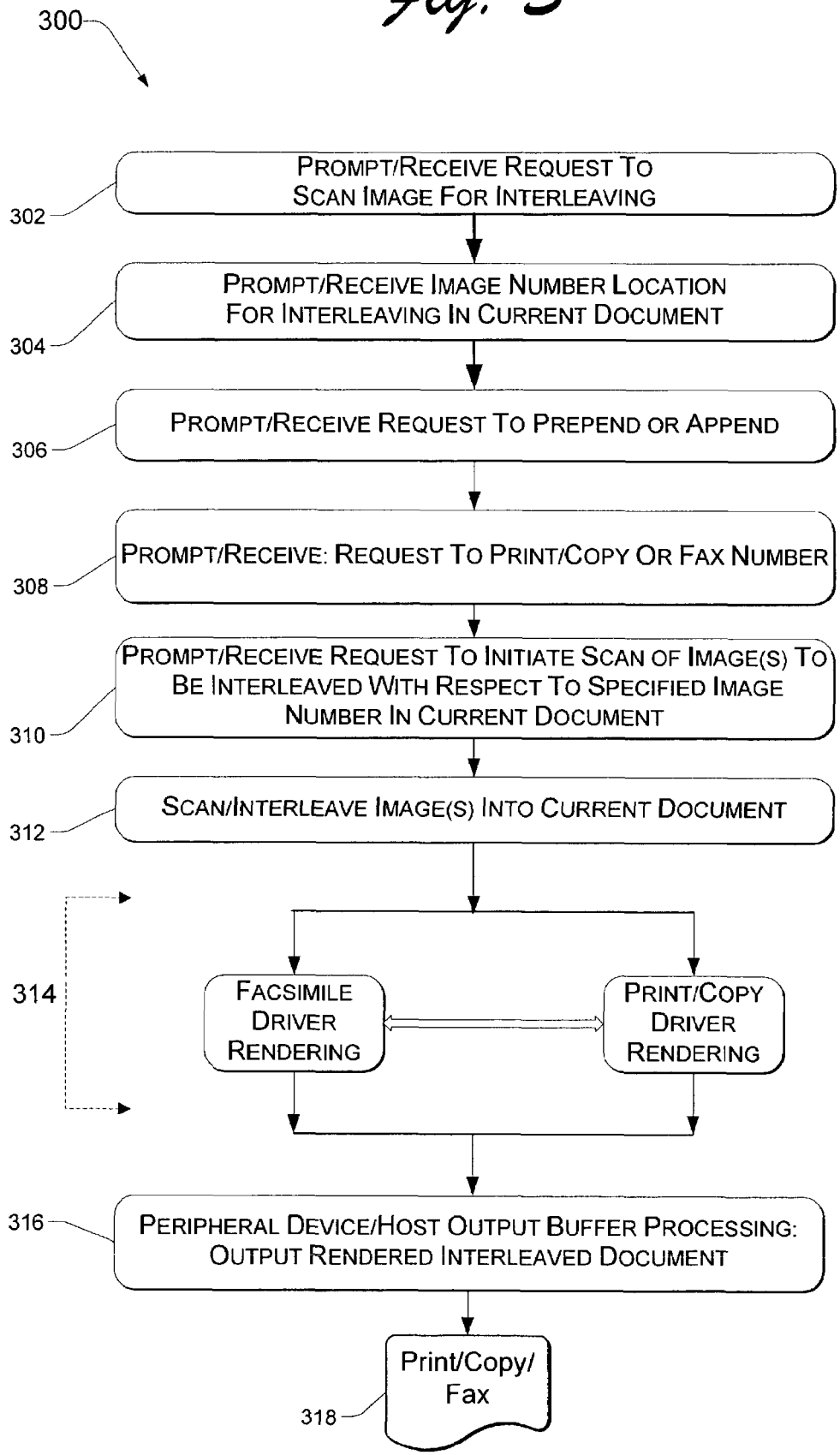

INTERLEAVED DOCUMENT RENDERING

FIELD OF THE INVENTION

The present invention relates generally to document rendering, and more particularly to rendering a document containing interleaved images.

BACKGROUND OF THE INVENTION

A file processing device, such as a personal computer or a workstation, can be used to create a file that contains images by executing one or more application programs. The file can contain different types of data, such as graphics data, chart data, text data, and object data. The type of data in the file can include digital representations of a plurality of images. In the file, the digital representations of the plurality of images will include first and last images. A document can be produced from the file. Documents can be created by different kinds of applications executing in a file processing device, where these kinds of applications include word processing programs, electronic mail programs, drawing programs, spread sheet programs, desk top publishing programs, etc. Once the document has been created it can be rendered. As used herein, the term 'rendering' is intended to mean the conversion of any computer data that represents the document into graphical elements that can be displayed or output, such as on a printed page or in a facsimile transmission. For example, when a user of a word processor program issues a command to print out a letter that the user has composed, the letter is said to be "rendered" by the word processor program in order to print the letter with a printer. Either or both of the word processor program and the printer can perform the rendering. The rendering converts the computer data into graphical elements that are stored in an output buffer. These graphical elements can then be printed on a printer or sent to a facsimile machine from or to which the rendered document can be transmitted in a facsimile transmission.

A document that is created by one or more application programs can contain a plurality of images. A problem arises when an image has been left out of the document. In order to position the estranged image into the document at a predetermined location that is between the beginning of the document and the end of the document, several significant hardware and software operations may be required. In would be advantageous to decrease the significance of the hardware and software operations required to place the image that has been left out of the document into the document at a predetermined location between its first and last images. Consequently, there is a need for improved methods, apparatuses, programs, and systems that can provide such a capability.

SUMMARY OF THE INVENTION

The above-stated needs and/or others are met, for example, by methods, apparatuses, programs, and systems wherein a digital representation of a document, including first and last images therein, is in storage. An image is optically scanned with a scanning mechanism. The optically scanned image is composed as a digital image. The document in storage is output such that the composed digital image is at a predetermined location between the first and the last images of the document.

These and other features of the present invention will become more fully apparent from the following description and appended claims, or may be learned by the practice of the invention as set forth hereinafter.

DESCRIPTION OF THE DRAWINGS

A more complete understanding of the various methods, apparatuses, programs, and systems of the present invention may be had by reference to the following detailed description when taken in conjunction with the accompanying drawings wherein the same reference numbers are used throughout the drawings to reference like components and features, and wherein:

FIG. 1 is a process diagram depicting the interleaving of an image at a predetermined location between an image "i" and an image "i-l" in a document, followed by a rendering of the document that includes that interleaved image.

FIG. 2 illustrates menu pages, according to an embodiment of the present invention, that might be displayed on a touch sensitive menu screen of a multi functional peripheral device (MFP) and transition sequences among the menu pages;

FIG. 3 is a flow diagram depicting an operation, in accordance with certain exemplary embodiments of the present invention, for use in a computing and communication environment, in which a user captures and interleaves an image at a predetermined location between the first and last images of a preexisting document;

FIG. 5 is a block diagram, according to an embodiment of the present invention, illustrating a host and an MFP both of which are in local and/or remote communication through an interconnecting network in a system such as that shown in FIG. 4a.

DETAILED DESCRIPTION

Figure 4A:
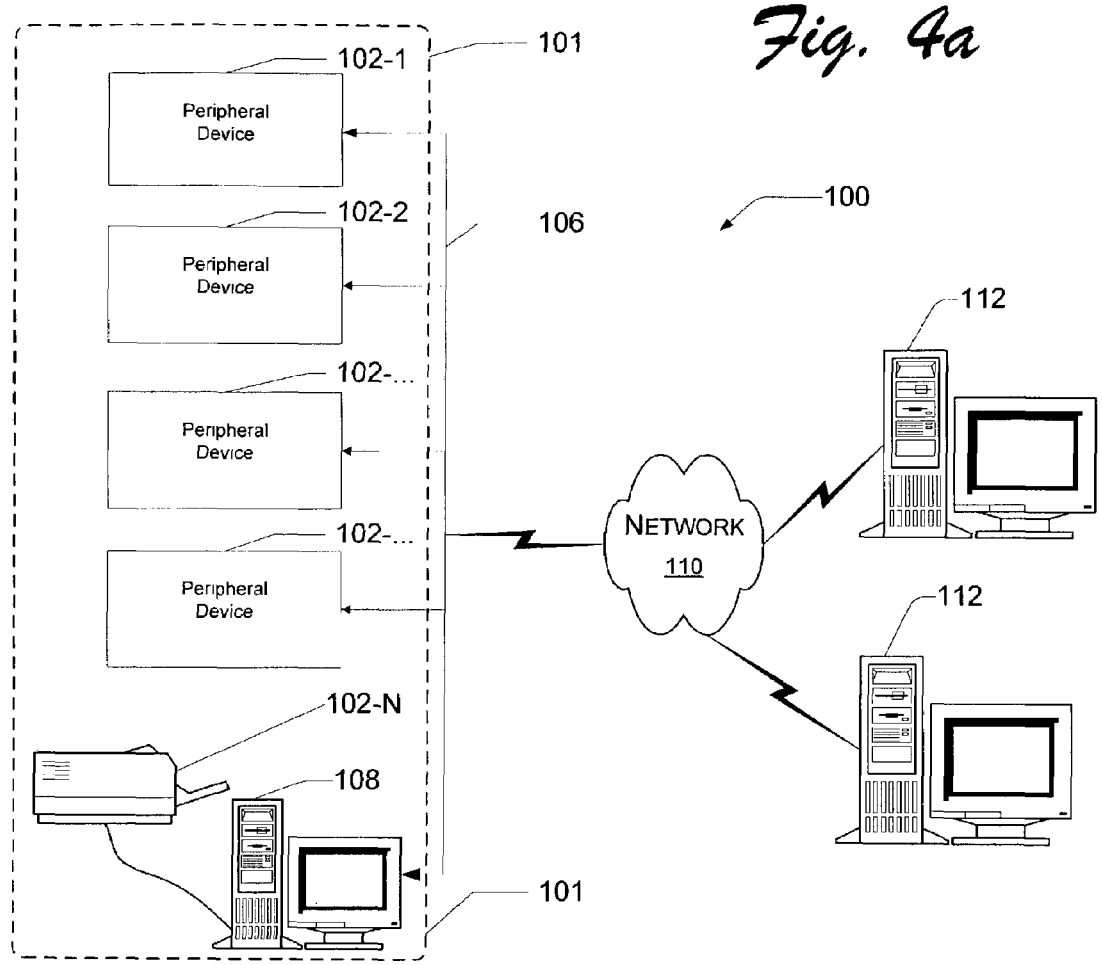
FIG. 4a is a block diagram, according to an embodiment of the present invention, depicting a computing and communication environment having peripheral devices in a system environment suitable for providing local access thereto.

The methods, apparatuses, programs, and systems, according to various embodiments of the present invention, relate to a file containing data that has been rendered by a driver for output. The rendered output can be formatted for a facsimile transmission or for a printing operation. The data from which the rendering is made can be from a document. The data contains logical first and last digital images. Another digital image can be interleaved at one or more predetermined locations between the logical first and last digital images.

As used herein the act of interleaving is intended to mean the logical positioning, insertion, or placement of a digital image into a logically arrangement of digital images contained in data in a preexisting file, where the data in the preexisting file has been rendered by a driver for output as described above, where the data includes logical first and last digital images, and where the digital image is logically positioned, inserted, or placed into the data in the preexisting file at a predetermined position that is between the logical first digital image in the data and the logical last digital image in the data. An interleaved file is intended to mean a preexisting logical arrangement of a plurality of digital images into which a digital image has been positioned, inserted, or placed so as to be logically situated between the plurality of digital images. As such, the positioned, inserted, or placed digital image is logically adjacent to or sandwiched between two digital images of the plurality of digital images in the data of the preexisting file. Stated otherwise, an interleaved file is a preexisting logical arrangement of logically first and last digital images between which a digital image has been logically positioned, inserted, or placed.

Each digital image in the data of a preexisting file can be one or more pages of text and/or graphical images, one or more paragraphs of text, one or more sections of a document, and/or one or more image-bearing sheets that have been scanned into a scanning mechanism of a document scanning device in order to capture the images thereon. The preexisting file can be created by scanning sheets of paper into a multifunctional peripheral device (MFP). The data in the preexisting file can be created by a driver the produces a rendering for a facsimile transmission or for a printing operation. The driver, which can be an aspect of an operating system of a document processing device, can be called by an application program executing on the document processing device. The document processing device such as a personal computer, a work station, or another hosting device such as a network resource on a network (e.g. a server). The application program that creates a document can be a word processing application, an electronic mail program, a drawing program, a spread sheet program, a desk top publishing program, or other document creation and/or editing application programs.

Once the document has been created, the document has at its beginning a first image and also has a last image at the end thereof. In one embodiment of the present invention, an image can be captured by a scanning mechanism of a peripheral device. An operation, such as can be performed by a driver, is evoked by an application program to render the document into a format for a facsimile transmission or into a format for printing. The operation can also be evoked to interleave into the rendered document the image captured by the scanning mechanism of the peripheral device. The interleaving driver changes the first rendering into a second rendering that is also formatted for a facsimile transmission or for printing, where the second rendering contains the captured image interleaved between the first and last images of the document. The second rendering interleaves the image at one or more predetermined or specified locations. A printer can then print the second rendering, which can be stored in an output buffer. Alternatively, the second rendering can be transmitted from the output buffer as a facsimile transmission by a facsimile machine.

The methods, apparatuses, programs, and systems, according to various embodiments of the present invention, can also relate to a document containing first and last images each of which represents a page that is to be output in the form of a print out or a facsimile transmission. The document is stored in a memory of a computing device. Prior to the output of the document onto a plurality of pages, one or more additional images, each of which represents a page, can be optically scanned and then digitized into a digital representation that is stored in the memory of the computing device. The memory also stores a predetermined page number of the document in the memory of the computing device after or before which the digitized scanned pages are to be interleaved (e.g. positioned, inserted, or placed). The interleaved, formatted rendering can then be output in the form of a print out or a facsimile transmission. When the interleaved, formatted rendering is output, the print out or facsimile transmission will contain the first and last pages that were originally in the document as well as one or more respective pages there between that bear the one or more additional images.

Referring now to FIG. 1, a preexisting document is depicted as having first and last of a plurality of images, each being shown as a separate page. The preexisting document has been rendered into a format suitable for facsimile transmission or for printing. An image, represented as a single page, that has been scanned is shown as being interleaved, in an interleaving process, into the formatted rendering at a specific location within the preexisting document that is ahead of (e.g. 'prepended' before) an image "i" and that is appended after an image "i-l". A second rendering process follows the interleaving process in which a rendered interleaved document in formed in an output buffer in a format that is, again, suitable for facsimile transmission or for printing. The interleaving places the scanned image at a specified location within the document as represented in the resultant formatted second rendering. In another implementation, a operation, such as can be performed by a driver, is evoked by a document processing application for the purpose of rendering images 1 through "i-l" into a format for facsimile transmission or for printing. The operation then similarly renders the scanned image, and lastly renders images "i" through the last image so as to be situated after the rendered scanned image.

Many peripheral devices in a computer network can include a scanner component. One example of such a peripheral device is an "all-in-one", also known as an MFP in that it has the capability to perform the multiple functions of scanning hardcopy documents, copying, and printing. Another example of an MFP is a digital network copier that scans in documents from an automatic document feeder (ADF), does high volume copying, and has the capabilities of binding, collating, folding, stacking, stapling, stitching, edge-trimming, paginating, and printing on substrates of varied composition. Each of these peripherals can be in communication with an interconnecting network and typically include an input device (e.g. a keyboard), a display, a scanner, and a printer.

A multifunction peripheral (MFP) can be used in one embodiment of the present invention where a user wishes to interleave, insert, or place an image at a specified location within the document that has been previously scanned into the MFP. In an exemplary MFP operation, a hardcopy of a document can be presented to the scanner portion of an MFP. After scanning, the MFP transforms the scanned image into a digital representation of the document that is then rendered into a data format, such as in a bit map data format or in a Portable Document Format (PDF). The MFP can be used as a printer to print out the document or as a facsimile machine in order transmit the document as a facsimile document to an identified facsimile telephone number address that a user manually enters at the MFP or that the user specifies using a defined list of facsimile telephone number addresses.

If a user wishes to interleave, insert, or place an image at a specified location within the document that has been previously scanned into the MFP, the user can input to the MFP the desired location in the scanned document (e.g. before or after a particular page number in the document), such as by using a user interface. The user can then scan the image using the scanner portion of an MFP. The MFP can then perform the user's requested interleaving, inserting, or placement function at the user's specified location into the rendering that is rendered by a driver into a format suitable for facsimile transmission or for printing. The resultant interleaved rendering can then be printed out or transmitted in a facsimile transmission so as to contain the scanned image at the user's specified location in the previously scanned document.

The desired result of the printed and/or faxed document containing the scanned image situated at the user's specified location, in accordance with various embodiments of the present invention, can be accomplished through use of various software and/or hardware algorithms which can be implemented by those of ordinary skill in the relevant arts by using the present disclosure as a guide.

Before or after the preexisting document, and an image to be added thereto, have been scanned into the MFP, the user can decide whether to print or fax the resultant document. Here, a decision print is essentially a decision to make a printed copy of the document such that the copy includes the added image. Either decision can be communicated to the MFP through a host computer into which the user has directed instruction through a user interface thereto, or to a user interface of the MFP. Either or both user interfaces can be used by the user to make a request to print out the interleaved document or to send the interleaved document in a facsimile transmission. The print out or the facsimile transmission can be performed by the MPF, by a printer, or by a facsimile machine, any of which are in communication with a memory holding the scanned image captured by a scanning mechanism of the MPF. After the user has input the request and instructions by any of these techniques, the interleaved and formatted rendering can be stored in an output buffer and the print out or facsimile transmission can proceed by using the data contained in the output buffer.

In illustration of an interleaving and rendering process, according to an embodiment of the present invention, FIG. 2 depicts a progressive series of menu pages which could be displayed on a touch sensitive menu screen of an MFP. Menu page 20 in FIG. 2 is a displayed menu upon the touch sensitive menu screen of the MFP where the MFP requests and receives a demand from a user to interleave an image. Upon the interleaving request input from the user, the touch sensitive menu screen displays menu page 22 where the current path, name or title a preexisting document being processed by the MFP is displayed. Menu page 22 displays a request to the user and receives input from the user of the image number in the document to be referenced in the interleaving process. By way of example and not by way of limitation, the image number can be a page number in the preexisting document. The MFP then transitions to menu page 24 where the user specifies whether the image to be interleaved is to be appended or prepended with respect to the referenced image in the document. When menu page 26 is displayed upon the touch sensitive menu page after menu page 24, a display is made to summarize the interleaving request from the user, and the user is prompted to place the one or more images to be scanned and interleaved into a sheet feeder or a flat bed scanner, or to place the same within the capture view of a digital camera or other image capturing mechanism.

When the user touches the "Select" section of the touch sensitive screen, the scanning process begins to capture the image placed in the image capturing mechanism of the MFP by the user. Menu page 28 reports a message to the user as to the result of the interleaving process. This report can also be amended to include the result of a rendering operation of the interleaved document. Another prompt, which can optionally be presented earlier to the user such as in menu page 26, requests instructions from the user as to whether the document is to be copied or printed or is to be transmitted in a facsimile transmission. If the user requests the latter, the user can use the touch sensitive menu screen to enter and then transmit to a facsimile telephone number address.

Menu pages 20–28 provide an example of a 'drill-down' function of the touch menu screen. Each menu page can be presented by script code executing on one or more processors of the MFP. In one embodiment of the present invention, the script code can allow the user to input numbers and alphabetic and symbolic characters so as to specify a path name, title, or address of an output device to print out or to transmit a facsimile of the preexisting document that is to be interleaved with a scanned image. As such, the user can input these numbers and alphabetic and symbolic characters by depressing virtual buttons 1004 to move forward and backward through a displayed hierarchical list of available numbers and alphabetic and symbolic characters. The script code can execute a routine when the user selects a displayed character by depressing virtual button 1006. When the user has input all the characters desired as displayed upon the touch sensitive menu screen, the user can then depress virtual button 1006 twice to indicate that the entry of the desired input is complete. Other virtual buttons on the touch sensitive menu screen are also contemplated in order to provide for the initiation of other or additional functions by the user, such as an item virtual item button 1008 seen in FIG. 2.

The menu pages shown in FIG. 2 can be modified to allow a user to select characters of a title, path name, or address of a preexisting document to be retrieved by the MFP. In such an embodiment of the present invention, the user selects a sequence of characters by depressing virtual buttons 1004 to thereby move forward and backward through the sequence of characters. Alphabetic and symbolic sequences of characters can be selected by the user on each menu page where needed. Following input by a user, the user can depress virtual button 1006 to select a particular sequence of characters that identifies the document displayed on the menu page. Once the user-identified document has been retrieved by the MFP, the scanning, interleaving, and rendering procedures described above can be performed.

Exemplary Embodiment of Interleaving and Rending Processes

A flow diagram depicts an operation as a process 300 in FIG. 3 to illustrate certain exemplary functions that can be performed using intercommunicating scanning, interleaving, and rendering mechanisms so as to form a rendered interleaved document that is formatted for facsimile transmission or for printing and is stored in an output buffer. The rendered interleaved document in the output buffer can then be printed or transmitted by facsimile, respectively, by printing and facsimile transmission mechanisms.

At block 302 of process 300, a user is prompted with a diagnostic to which the user responds with a request to scan an image to be interleaved into a document. Upon receipt of the request to scan and interleave from the user, process 300 moves to block 304 where the user is prompted with a prompt to which the user responds with a location in the document at which an image that is to be scanned is to be placed. The interleaving process can be supplied with intelligence to recognize specific locations within a document numerically, chronologically, by title or path name, or by other location identifier to which the interleaving process has intelligence.

Upon receipt of the location, the user is prompted at block 306 as to whether the scanned image is to be prepended or appended with respect to the requested location. At block 308, the user can specify whether the resultant interleaved document is to be printed or is to be transmitted in a facsimile transmission. If the latter is specified, the user also inputs a facsimile telephone number address directly or through selection from a list of the same that is displayed to the user. The scan of the image can be initiated by the response of the user to a prompt at block 310 prior to which the user will have then placed the image to be scanned into a location where a scanning mechanism can capture the image. By way of example and not by way of limitation, the image can be captured by a scanning mechanism by placing one or more pages bearing the respective one or more images in a sheet feeder of an MPF (e.g. an Automatic Document Feeder or ADF), on a bed of a flat bed scanner, in the capture view of a digital camera or a hand-held scanner, etc.

At block 312, the image is captured by the scanning mechanism. Depending upon the type of data in the document, one or more rendering procedures can be performed at block 314 upon the document, where the result of the rendering process(es) will be a rendered interleaved document that is formatted for facsimile transmission or for printing, where the resultant formatted document can be stored in an output buffer.

In one embodiment of the present invention, the scanning mechanism of an MFP is used to scan in a first document. A second document is then scanned by the scanning mechanism of the MFP along with a request input by a user into MFP to interleave the second document at a specific location within the first document between the first and last images thereof. The specific location was identified by the user at block 304 of process 300. The MFP processes the images that were optically scanned in from the two documents. An interleaving process is evoked, simultaneously with, before, or after one or more rendering processes, to append or prepend the scanned image at the specific location that the user identified at block 304 of process 300, and the foregoing processes result in a final interleaved rendering. The final interleaved rendering is formatted specific to the requirements of the MFP. The data of the final interleaved rendering can be stored in an output buffer for subsequent facsimile transmission or for printing. As such, the foregoing processes conducted by the MFP result in the output of a document from the MFP that has interleaved the second document, as requested by the user, into the first document. The document that is output from the MFP can be a print out or a facsimile transmission to a telephone number address.

In another embodiment of the present invention, the rendering process seen at block 314 can be evoked by a document processing application such as a word processor, a spread sheet program, etc. Each document processing application can be executing on a document processing device, such as a personal computer, a work station, a server, etc. In one embodiment of the present invention, one or more of the applications can include a spooler for spooling print and/or facsimile jobs into the output buffer. In one embodiment of the present invention, the application evokes one or more drivers that operate rendering processes that respectively render an original document and a document to be interleaved. These rendering processes format data specific to requirements of a peripheral device, such as a printer, an MFP, or a facsimile machine. An interleaving process is evoked, simultaneously with, before, or after these rendering processes, to append or prepend the rendered scanned image at the location that the user identified at block 304 of process 300, and the foregoing processes result in a final interleaved rendering. The final interleaved rendering has formatting specific to the requirements of the peripheral device. The data of the final interleaved rendering can be stored in an output buffer. The output buffer can then transmitted in a transmission to the peripheral device. The output buffer, which can be stored locally at and/or remotely from the peripheral device, can be used by the peripheral device to output the formatted and interleaved rendered document.

When the peripheral device is a printer or a facsimile machine, the output buffer can be a print buffer, and a transmission can contain the contents of the output buffer and printer control language. The printer control language can be issued by a printer driver executing in a processor to control a peripheral device that is a printer or a facsimile machine. The transmission can also be received by a printer engine executing on a processor of the printer or the facsimile machine. The printer, or the facsimile machine, can be a Graphical Display Interface (GDI) printer or a printer interpreting a page description language. In one embodiment of the present invention, a print rendering device can assist the printer or the facsimile machine by rendering all or part of an interleaved document into the output buffer and from which the printer or the facsimile machine outputs the document.

Process 300 proceeds from the rendering process at block 314 to block 316 where the interleaved, rendered, and formatted data in the output buffer is used to create an output document 318 that can be a printed document or a facsimile document. In various embodiments of the present invention, an outputting device that is used to create output document 318 (such as a peripheral device, a facsimile machine, or a printer) is coupled to a document processing device, such as a personal computer or a workstation or another host. As such, one or more drivers are called to form the data of the final formatted and rendered interleaved document. For example, the data from an initial document can be generated by one or more application programs (e.g. word processing programs, electronic mail programs, drawing programs, spread sheet programs, desk top publishing programs, etc.) executed by the document processing device. The initial document may include any type of graphical elements or information supported by the outputting device, including text, pictures, and so forth. The document processing device can evoke a process, such as can be performed by a driver, that renders data that is formatted into a language that is understood by the outputting device. Where the outputting device is a printer, the language can be Printer Control Language (PCL) or Postscript. A particular outputting device may understand a single language, thereby requiring the processing device to translate the output job into that single language. This type of outputting device requires an attached processing device to convert the raw output job data into a format (i.e., language) that is understood by the outputting device.

Other outputting devices may be capable of processing output jobs in multiple languages. These outputting devices are typically more complicated because they are required to identify, interpret and process output commands in several different languages. Although these outputting devices are more complicated, they typically require an attached processing device to provide the output job and other output control information to the outputting device. Another type of outputting device contains its own output rendering engine that is capable of generating an output document from raw output job data. Although this type of outputting device contains its own output rendering engine, it is typically coupled to a document processing device, such as a computer, to receive the raw output job data generated, for example, by an application running on the computer.

Process 300 seen in FIG. 3 can be altered such that interleaving and rendering mechanisms are performed in a different order than illustrated. The interleaving and rendering mechanisms can be performed simultaneously. The rendering of the images that are to be before and after an added image to be interleaved into the document can be rendered separately or at the same time, and the rendering of the added image to be interleaved into the document can be performed in an order or sequence other that an depicted in FIG. 3. Additionally, the added image can be interleaved at a plurality of predetermined locations in a document. The process, method, or procedure implemented to accomplish the result of the printed and/or faxed document containing a scanned image situated therein at a predetermined location, in accordance with various embodiments of the present invention, can be accomplished through use of various software and/or hardware algorithms which can be implemented by those of ordinary skill in the relevant arts by using the present disclosure as a guide.

Exemplary System for Configuration

FIG. 4a illustrates an example, according to an embodiment of the present invention, of a system environment 100 suitable for implementing a process that controls the capturing of an image and the accomplishment of the result of a printed and/or faxed document that contains the captured image situated therein at a predetermined location within a preexisting document. FIG. 4a also illustrates an example, according to yet another embodiment of the present invention, where system environment 100 is suitable for implementing a process that controls the optical scanning of an image, the interleaving of a digital representation of the optically scanned image into a preexisting document containing images at a predetermined location or order between a first and a last digital image therein, and the rendering of the interleaved document in which the scanned image is represented.

Figure 4B:
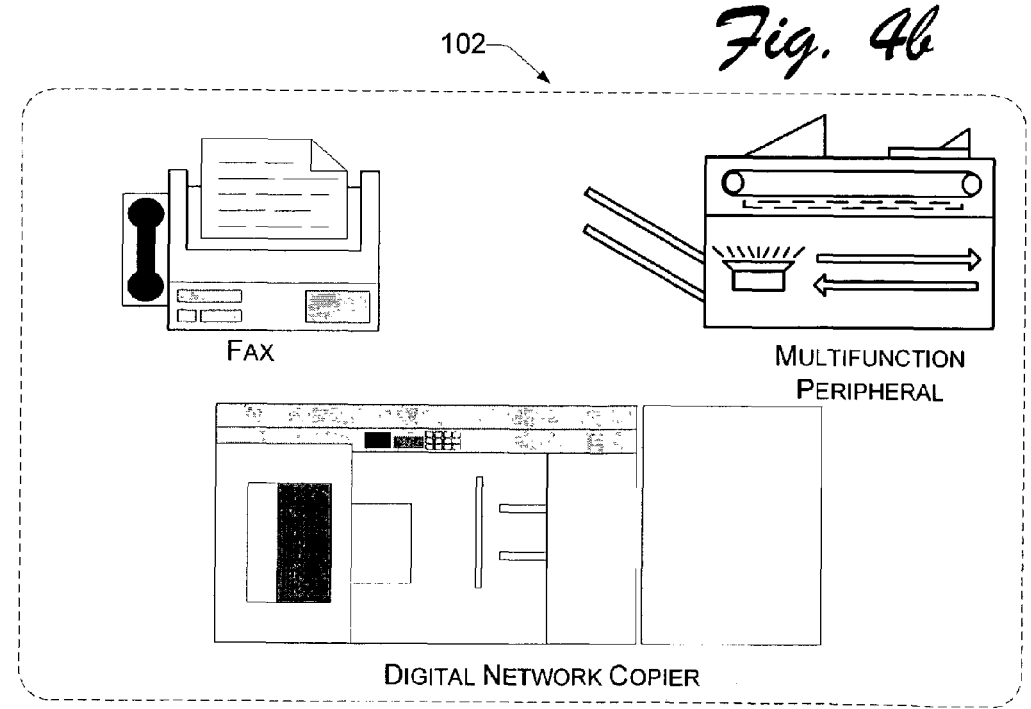
FIG. 4b illustrates various multifunctional peripheral devices (MFP)s, according to various embodiments of the present invention, that provide local access for input thereto.

System environment 100 contemplates local access to a scanning mechanism in order to capture an image, such as an optical scanning mechanism. MFPs 102-1 through 102-N generally include peripheral devices and stand-alone devices, each of which can have a scanning mechanism. Stand-alone devices include certain peripheral devices that often function while uncoupled or isolated from other devices. MFPs 102 therefore include devices such as digital presses, digital network copiers, and fax machines like those shown in FIG. 4b.

MFPs 102 are generally distinguishable from devices such as laptop PCs (personal computers) and pocket PCs by their limited purpose and limited user interface or input/output capabilities. For example, a typical user interface for an MFP 102 includes a front menu panel with limited screen space and a limited number of buttons. In addition, an MFP 102 can perform scanning. By contrast, devices such as laptop and pocket PCs often provide multiple and varied means of input/output such as a full screen display, a QWERTY keyboard, a trackball mouse, speakers, microphones, PCMCIA (Personal Computer Memory Card International Association) slots, portable media drives and the like. These devices are capable of performing multiple functions through executing data manipulation function using various software applications such as word processing applications, spreadsheet applications, financial applications, network browsers and network messaging applications.

An interconnecting network 110 is representative of one or more communication links, either wired or wireless, that are capable of carrying data between MFP 102 and other network resources in communication with interconnecting network 110. In certain exemplary implementations, interconnecting network 110 includes a local area network (LAN), a wide area network (WAN), an intranet, the Internet, or other similar network. MFP 102, as seen in FIG. 4a, is typically coupled to interconnecting network 110 either indirectly to through a host computer 108 in an Intranet 101, or through a network connection 106 to interconnecting network 110.

A user can use an input device, such as a touch sensitive menu screen on an MFP 102, or a keyboard or other input device associated with host computer 108 or a network resource such as a server 112. The user accesses the input device for various purposes, including the entering of information relating to the capturing of an image and the specification of a location in a preexisting document at which the captured image is to be interleaved into the preexisting document.

Figure 5:
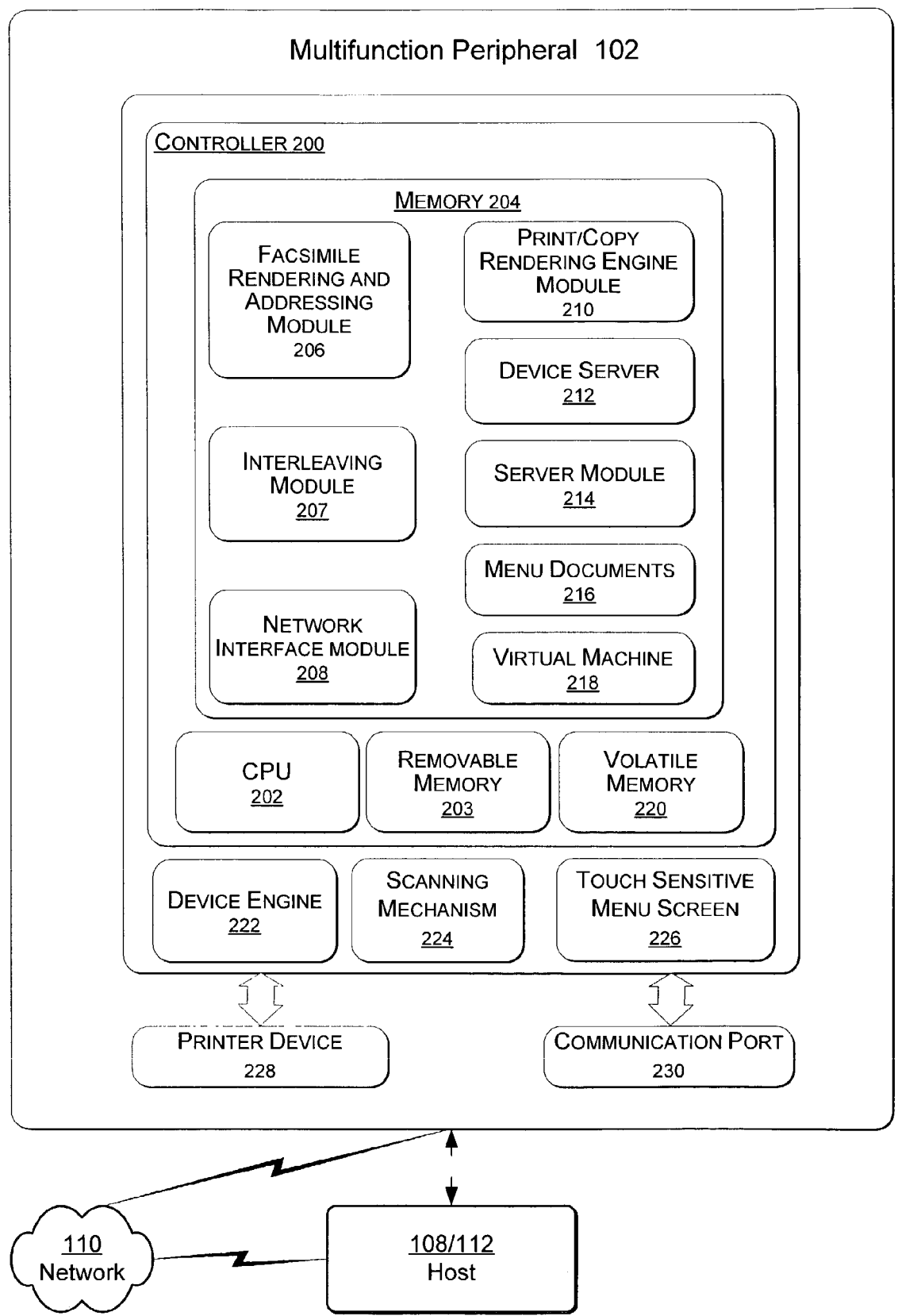

System environment 100 of FIG. 4a, according to an embodiment of the present invention, includes MFP 102 as a peripheral device coupled through an interconnecting network 110. As such, FIG. 5 illustrates an embodiment of the present invention with respect to the system environment 100 of FIG. 4a in greater detail. A user of MFP 102 may print out a hardcopy of a rendered interleaved document processed by MFP 102 using a printer device 228 that can be integral therewith. In general, MFP 102 uses a controller 200 to execute a program so as to transform data received from interconnecting network 110 or from host computer 108 to a driver format suitable for printing with integral printer device 228, such as a mark up language format (e.g. SMGL, HTML, or XML), or such as a job language format (e.g. PCL or postscript). Printer device 228 can have the capability of converting the host data, such as a bitmap image of a rendered interleaved document in an output buffer, and then outputting the bitmap image onto an appropriate print media, such as paper, transparencies or glossy photo paper.

MFP 102 includes one or more CPUs 202 in controller 200, which are operatively coupled to a memory 204, and a user interface that includes an input device. The one or more CPUs 202 in multifunctional peripheral (MFP) 102 are operatively coupled to printer device 228. Preferably, the input device will be locally accessible at MFP 102. By way of example, the input device can be a touch sensitive menu screen 226. Memory 204 includes a network interface module 208 for interfacing MFP 102 with the interconnecting network 110 through at least one communication port 230. Memory 204 can store several application modules that can be executed by the one or more CPUs 202, including a facsimile rendering and addressing module 206, a captured image interleaving module 207, and a print/copy rendering engine module 210. A user of MFP 102 may send a facsimile transmission of a rendered interleaved document processed by MFP 102 using an application stored in facsimile rendering and addressing module 206 of memory 204 as executed by the one or more CPUs 202.

MFP 102 includes a scanning mechanism 224 for capturing images. By way of example and not by way of limitation, scanning mechanism 224 can be a sheet fed scanner, a flat bed scanner, a hand held scanner, a digital camera, or other device capable of capturing an image. As such, scanning mechanism 224 is representative of any optical scanner technology that may be employed to produce scanned object data upon scanning an object. The resulting scanned object data is provided to the one or more CPU 202 and/or stored in memory 204 for conversion into a digital representation thereof.

The one or more CPUs 202 are representative of any hardware, firmware and/or software that is configured to perform certain functions associated with the operation of MFP 102. Hence, as those skilled in the art will recognize, the one or more CPUs 202 may include dedicated logic and/or one or more processors configured in accord with software instructions, for example.

Memory 204 is representative of any type of data storage mechanism that can be accessed by at least CPU 202. Memory 204 may therefore include, for example, some form of random access memory (RAM), some form of read only memory (ROM), and/or other like solid-state data storage mechanism. Memory 204 may include a magnetic and/or optical data storage mechanism.

Controller 200 can process data from host computer(s) 108/112. The controller 200 typically includes the one ore more data processing units or CPUs 202, a volatile memory 220 (i.e., RAM), and a non-volatile memory 204 (e.g., ROM, Flash). MFP 102 also includes a device engine 222. The touch sensitive menu screen 226 acts as a local user interface for MFP 102 by displaying menu pages and accepting user input based on selectable menu items displayed on the menu pages. The touch sensitive menu screen 226 can be used to display a menu page that asks for and receives input that may be used to control the interleaving, rendering, and output of a document from MFP 102.

Controller 200 processes host data and manages device functions by controlling device engine 222 and by responding to input from touch sensitive menu screen 226. Controller 200 includes device driver software in a device server 212 that is stored in a memory 204 and executed on a processor, such as the one or more CPUs 202. Memory 204 also includes a server module 214 that can be configured to serve menu documents 216 to the touch sensitive menu screen 226. The server module 214 can be a local server in the sense that it is present within the same MFP 102 to which it serves menu documents 216. Menu documents 216 can be interpreted by the server module 214 and can be configured to display textual and graphical information as menu pages on the touch sensitive menu screen 226, for example, as is seen in FIG. 2.

Graphical keys or buttons presented on menu pages that are displayed by the touch sensitive menu screen 226 offer selectable menu items that are described by accompanying textual information. Menu documents 216 driving the menu pages can include script code that is associated with graphical keys. The term "script code" is intended herein to mean any one of a variety of different code types. Various kinds of code are contemplated. By way of example, the code can be implemented in embedded script code, in firmware, or in a native code such as C++ code. The code can also be written in JavaScript code that is interpreted and executed on a Java Virtual Machine (JVM) 218, or in ChaiServer™ code that is interpreted and executed on a Chai™ Virtual Machine 218. The code can also be written in other script code languages such as VBScript or Perl. Moreover, the code can also be written in other software or machine languages including but not limited to C++ or C#. Alternatively, algorithms can be resident in MFP 102 and programmed in any common embedded processor code.

Selecting a menu item by pressing a graphical key on the touch sensitive menu screen 226 triggers an event which causes a "virtual machine" 218 to interpret and execute the script code associated with the selected graphical key. The virtual machine 218 is a software module stored in memory 204 that executes on the one or more CPUs 202 to interpret and execute script code.

The script code associated with selectable menu items (i.e., graphical keys or buttons) is configured to perform the task of receiving input of a document title, path name, address or image location thereof, and a command to print or to fax with a telephone fax address therefore for transmission of an interleaved rendered document from MFP 102. When the user inputs the facsimile telephone number address, the script code associated with selectable menu items will initiate an application stored in facsimile rendering and addressing module 206 for execution by the one or more CPUs 202 in conjunction with services of a third party telephone exchange service, which can be understood as being represented by the communication with interconnecting network 110 seen in FIG. 5.

The result of the various renderers is consolidated into an output buffer in a driver format suitable for facsimile transmission and/or for printing with integral printer device 228, such as a mark up language format (e.g. SMGL, HTML, or XML), or such as a job language format (e.g. PCL or postscript). The output buffer, which receives the interleaved rendering from one or more rendering processes, can be stored in memory 204 and/or in a memory at host 108/112. An outputting device, such as any peripheral device 102 seen in FIG. 4a, can then access the output buffer to output a print out or to transmit a facsimile thereof.

Accordingly, methods, apparatuses, programs, and systems are provided that allow for the interleaving of a captured image into a document that is rendered into an output buffer for outputting by a peripheral device such as a printer or for transmission by a facsimile machine.

Thus, although some embodiments of the various methods, apparatuses and programs of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. An apparatus comprising:
    means for storing a document including representations of a first image and a last image thereof, the document having been rendered in preparation for output as one or more printed pages or as a facsimile transmission;
    means for scanning an image with the scanning mechanism;
    means for composing an image of the scanned image; and
    means for outputting the document such that the composed image is output at a predetermined location in the output document between the representations of the first image and the last image of the document, such that the composed image is inserted within the document as has already been rendered.

2. The apparatus as defined in claim 1, wherein the means for scanning is an optical scanning device having means for feeding pages to an optical scanning mechanism.

3. The apparatus as defined in claim 1, further comprising:
    means for communicating with a host computer; and means for communicating with a server that includes an output buffer, wherein:
the means for outputting the document is selected from the group consisting of a printer, a copier, and a facsimile transmission machine.

4. The apparatus as defined in claim 1, wherein the first and last images of the document are, respectively, the first and last pages of the document.

5. The apparatus as defined in claim 1, wherein means for outputting the document further comprises:
means for interleaving the composed image at the predetermined location in the output document between the representations of the first image and the last image of the document to form an interleaved document, and;
means for rendering the interleaved document to form data in an output buffer representing a rendered interleaved document, wherein the means for outputting the document outputs the data in the output buffer representing the rendered interleaved document.

6. A computer-readable medium having computer-executable instructions which, when executed on a processor in a peripheral device also having a scanning mechanism, an output mechanism, and a memory in which is stored a document including digital representations of a first page and a last page thereof, the document having been rendered in preparation for output as one or more printed pages or as a facsimile transmission, direct the peripheral device to perform of a method comprising:
optically scanning a page bearing an image with the scanning mechanism;
composing a digital image of the image on the optically scanned page; and
outputting the document with the output mechanism such that the composed digital image is output on a predetermined page number in the output document between the digital representations of the first page and the last page of the document, such that the composed digital image is inserted within the document as has already been rendered.

7. The computer-readable medium as defined in claim 6, wherein the outputting the document with the output mechanism further comprises:
interleaving the composed digital image at the predetermined page number in the output document between the digital representations of the first page and the last page of the document;
rendering the interleaved document to form data in an output buffer representing the rendered interleaved document; and
outputting the data in the output buffer representing the rendered interleaved document to the output document.

8. The computer-readable medium as defined in claim 6, wherein:
the output mechanism is a printer; and
the output document is a printed document.

9. The computer-readable medium as defined in claim 6, wherein the output mechanism is a facsimile transmitter mechanism and the output document is transmitted thereby to a predetermined facsimile telephone number address.

10. A system comprising:
a scanning mechanism;
a memory storing a file, wherein:
the file includes digital representations of a plurality of images, the file representing a document having been rendered in preparation for output as one or more printed pages or as a facsimile transmission; and
said plurality of images include a first said image and a last said image;
an output buffer;
a processor, in communication with the scanning mechanism, the output buffer, and the memory, to execute a document outputting application to:
compose a digital image of an image from the scanning mechanism; and
output an output document to the output buffer in which the composed digital image is at a predetermined location in the output document between the digital representations of the first image and the last image of the document, such that the digital image is inserted within the document as has already been rendered; and
an output device, in communication with the output buffer, to output the output document in the output buffer.

11. The system as defined in claim 10, wherein the output device is a printer that outputs the output document as a printed document.

12. The system as defined in claim 10, wherein the output device is a facsimile transmitter mechanism that outputs the output document as a facsimile transmission that is transmitted to a predetermined facsimile telephone number address.

13. The system as defined in claim 10, further comprising an MFP that includes the scanning mechanism, the memory, the output buffer, the processor, and the output device.

14. The system as defined in claim 10, further comprising:
a host computer that includes the memory, the output buffer, and the processor;
a printer that includes the output device; and
an optical scanning device that includes the scanning mechanism.

15. The system as defined in claim 10, further comprising:
a host computer that includes the memory and the processor;
a server that includes the output buffer;
a first peripheral device that includes the output device and that is selected from the group consisting of a printer and a facsimile transmission machine;
a second peripheral device that includes the scanning mechanism; and
an interconnecting network in communication with each of the host computer, the server, the first peripheral device, and the second peripheral device.

16. The system as defined in claim 10, wherein:
the file contains at least one data type selected from the group consisting of graphics data and text data; and
data of said at least one data type in the file was created by at least one file creation application selected from the group consisting of a word processing program, an electronic mail program, a drawing program, a spread sheet program, a desk top publishing program, and an ASCII rendering program.

17. The system as defined in claim 10, wherein:
the output document in the output buffer is represented as pages including a first page bearing the first image and a last page bearing the last image; and
the composed digital image is born on one said page that is between the first and last pages.

18. A method comprising:
storing a document including digital representations of a first image and a last image thereof, the document having been rendered in preparation for output as one or more printed pages or as a facsimile transmission;

optically scanning an image with the scanning mechanism;

composing a digital image of the optically scanned image; and outputting the document such that the composed digital image is output at a predetermined location in the output document between the digital representations of the first image and the last image of the document, such that the composed image is inserted within the document as has already been rendered.

19. The method as defined in claim 18, wherein the optically scanning is performed by an optical scanning device having a page feeder to feed a page to an optical scanning mechanism.

20. The method as defined in claim 18, further comprising:

communicating with a host computer; and communicating with a server that includes an output buffer, wherein:

the outputting of the document is performed by a process selected from the group consisting of printing the document, copying the document, and transmitting a facsimile transmission of the document.

21. The method as defined in claim 18, wherein:

the document is contained in a file having at least one data type selected from the group consisting of graphics data and text data; and data of said at least one data type in the file was created by at least one file creation application selected from the group consisting of a word processing program, an electronic mail program, a drawing program, a spread sheet program, a desk top publishing program, and an ASCII rendering program.

22. The method as defined in claim 18, wherein the first and last images of the document are, respectively, the first and last pages of the document.

23. The method as defined in claim 18, wherein the optically scanned image is borne on a page scanned in by the means for optically scanning.

24. The method as defined in claim 18, wherein the outputting of the document further comprises:

interleaving the composed digital image at the predetermined location in the output document between the digital representations of the first image and the last image of the document to form an interleaved document, and;

rendering the interleaved document to form data in an output buffer representing a rendered interleaved document, wherein the outputting of the document outputs the data in the output buffer representing the rendered interleaved document.

25. The method as defined in claim 18, further comprising communicating, prior to storing the document, with a host computer to receive the document.

26. The method as defined in claim 18, wherein:

the outputting of the document includes printing or copying the document; and the outputted document is a printed document.

27. The method as defined in claim 18, wherein the outputting of the document resulting in a facsimile transmission of the document to a predetermined facsimile telephone number address.

28. The method as defined in claim 18, further comprising:

receiving the document in a transmission from a host computer; and formatting the document, prior to said outputting the document, wherein the formatting is selected from the group consisting of printing formatting, copying formatting, and facsimile transmission formatting.

29. A method comprising:

optically scanning a document with a scanning mechanism, wherein the document includes first and last pages each bearing an image;

storing a digital representation of each said image, the document having been rendered in preparation for output as one or more printed pages or as a facsimile transmission;

optically scanning a supplemental page with the scanning mechanism, wherein the supplemental page bears a supplemental image;

composing a digital image of the supplemental image on the optically scanned supplemental page;

receiving a request to interleave the supplemental image into the document at a predetermined location that is between the first and last pages of the document; and outputting the document such that the composed digital image of the supplemental image is output at the predetermined location in the output document between the first and last pages, such that the composed image is inserted within the document as has already been rendered.

30. The method as defined in claim 29, wherein the outputting the document further comprises an output operation selected from the group consisting of:

printing the document; and transmitting the document to a facsimile telephone number address.

31. The method as defined in claim 29, further comprising:

receiving multiple said predetermined locations; and outputting the document such that the composed digital image of the supplemental image is output at each said predetermined location in the output document between the first and last pages.

* * * * *